(12) United States Patent
Fukuju et al.

(10) Patent No.: US 9,216,909 B2
(45) Date of Patent: *Dec. 22, 2015

(54) AEROGEL AND METHOD FOR MANUFACTURE THEREOF

(75) Inventors: Tadahiro Fukuju, Yamaguchi (JP); Hiroshi Numa, Yamaguchi (JP); Kazuaki Tabata, Yamaguchi (JP)

(73) Assignee: TOKUYAMA CORPORATION, Shunan-shi, Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/825,187

(22) PCT Filed: Oct. 24, 2011

(86) PCT No.: PCT/JP2011/074447
§ 371 (c)(1),
(2), (4) Date: Mar. 20, 2013

(87) PCT Pub. No.: WO2012/057086
PCT Pub. Date: May 3, 2012

(65) Prior Publication Data
US 2013/0189521 A1    Jul. 25, 2013

(30) Foreign Application Priority Data

| Oct. 25, 2010 | (JP) | 2010-238693 |
| Dec. 20, 2010 | (JP) | 2010-282581 |
| Aug. 26, 2011 | (JP) | 2011-184319 |
| Aug. 26, 2011 | (JP) | 2011-184320 |

(51) Int. Cl.
*C01B 33/16* (2006.01)

(52) U.S. Cl.
CPC ........... *C01B 33/16* (2013.01); *Y10T 428/2982* (2015.01)

(58) Field of Classification Search
CPC .......................... C01B 33/16; Y10T 428/2982
USPC ...................... 428/402; 423/335, 338; 252/62
See application file for complete search history.

(56) References Cited

U.S. PATENT DOCUMENTS

| 4,402,927 A | * | 9/1983 | von Dardel et al. | 423/335 |
| 5,270,027 A | * | 12/1993 | Balducci et al. | 423/338 |
| 5,795,556 A | * | 8/1998 | Jansen et al. | 423/338 |
| 5,830,387 A | | 11/1998 | Yokogawa et al. | |
| 5,888,425 A | | 3/1999 | Schwertfeger et al. | |
| 6,103,209 A | * | 8/2000 | Balducci et al. | 423/338 |
| 6,197,270 B1 | * | 3/2001 | Sonoda et al. | 423/338 |

FOREIGN PATENT DOCUMENTS

| CA | 2 291 229 A1 | 12/1998 |
| CA | 2291229 A1 | 12/1998 |
| CN | 1181053 A | 5/1998 |
| CN | 1258228 A | 6/2000 |
| CN | 1715182 A | 1/2006 |
| CN | 101318659 A | 12/2008 |
| CN | 101538046 A | 9/2009 |
| CN | 101844771 A | 9/2010 |
| DE | 4342548 A1 | 6/1995 |
| DE | 19722738 A1 | 12/1998 |
| EP | 0 537 851 A1 | 4/1993 |
| EP | 0 653 378 A1 | 5/1995 |
| EP | 0 658 513 A1 | 6/1995 |
| EP | 0 849 220 A1 | 6/1998 |
| EP | 0849220 A1 | 6/1998 |
| EP | 2703348 | * 3/2014 |
| EP | 2703348 A1 | 3/2014 |
| JP | 63-258642 A | 10/1988 |
| JP | 03-047528 A | 2/1991 |
| JP | 04-54619 B2 | 8/1992 |
| JP | 05-213614 A | 8/1993 |
| JP | 06-040714 A | 2/1994 |
| JP | 07-196311 A | 8/1995 |
| JP | 07-257918 A | 10/1995 |
| JP | 10-236817 A | 9/1998 |
| JP | 2000-143228 A | 5/2000 |
| JP | 2000-225767 | * 8/2000 |
| JP | 2000-225767 A | 8/2000 |
| JP | 2001-070741 A | 3/2001 |
| JP | 2001-080915 A | 3/2001 |
| JP | 2002-500557 A | 1/2002 |
| JP | 2008-247696 A | 10/2008 |
| WO | 94/25149 A1 | 11/1994 |
| WO | 96/22942 A1 | 1/1996 |
| WO | 98/53905 A1 | 12/1998 |

OTHER PUBLICATIONS

International Search Report mailed Nov. 22, 2011; PCT/JP2011/074447.
International Search Report dated Jul. 25, 2012; PCT/JP2012/061134.
USPTO NFOA dated Nov. 24, 2014 in connection with U.S. Appl. No. 14/110,473.
U.S. Appl. No. 14/110,473, filed Oct. 8, 2013.
Chul Oh, et al; "Distribution of Macropores in Silica Particles Prepared by Using Multiple Emulsions", Journal of Colloid and Interface Science 254, pp. 79-86; published online Sep. 16, 2002.
USPTO NFOA dated Jun. 26, 2015 in connection with U.S. Appl. No. 14/110,473.

(Continued)

*Primary Examiner* — Leszek Kiliman
(74) *Attorney, Agent, or Firm* — Ladas & Parry LLP

(57) ABSTRACT

An aerogel with excellent thermal insulation performance, average particle size of 1 to 20 μm and globular shape; and a method of manufacturing it efficiently, is provided. The aerogel has specific surface area by BET method of 400 to 1000 $m^2/g$; pore volume and peak pore radius by BJH method of 3 to 8 mL/g and 10 to 30 nm, respectively; average particle size and average circularity by image analysis method of 1 to 20 μm and no less than 0.8, respectively. The method includes the steps of: preparing an aqueous silica sol; dispersing the sol into a hydrophobic solvent, thereby forming a W/O emulsion; causing gelation of the sol, thereby converting the emulsion into a dispersion of a gel; replacing water in the gel with a solvent having a small surface tension; treating the gel with a hydrophobing agent; and removing the solvent used in the solvent replacement.

5 Claims, 3 Drawing Sheets

(56) References Cited

OTHER PUBLICATIONS

Elliott P. Barrett, et al; "The Determination of Pore Volume and Area Distributions in Porous Substances. I. Computations from Nitogen Isotherms", Journal of The American Chemical Society, vol 73, pp. 373-380, Jan. 1951.

"Catalyst Support Preparation and Application Technology", Petroleum Industry Press, Beijing; May 2002; pp. 538-539.

"Advanced Composite Materials" NationoNational Defense Industry Press, Bolin , May 2013; pp, 278-279.

"Technology of Chemicals for Paper Making", South China University of Technology Press, Aug. 2009; pp. 256-257.

USPTO NOA mailed Sep. 30, 2015 in connection with U.S. Appl. No. 14/110,473.

\* cited by examiner

AEROGEL AND METHOD FOR MANUFACTURE THEREOF

TECHNICAL FIELD

The present invention relates to an aerogel and a method for manufacture thereof.

BACKGROUND ART

Aerogels are materials with high porosity and excellent heat insulation properties. Herein, the aerogels refer to solid materials with a porous structure having air as a dispersion medium, and specifically solid materials having a porosity of 60% or more. The porosity represents the amount of air contained in an apparent volume of a material by a volume percentage. Thermal conduction in a material involves solid conduction (transmission of thermal vibrations), convection, and radiation. In general, contribution of convection to thermal conduction is largest in a material having a large porosity. On the other hand, since the aerogels have a very small pore size of about 10 to 100 nm, movement of the air through the voids is greatly obstructed and thermal conduction by convection is significantly inhibited. As such, the aerogels have excellent heat insulation properties.

A method for producing an aerogel is disclosed in which hydrolysis of alkoxysilane as a starting material and polycondensation of a resulting product are carried out to obtain a gelatinous compound; and the gelatinous compound is dried under a supercritical condition of a dispersion medium (Patent Document 1). Another method is also known in which an alkali metal silicate as a raw material is passed through a cation exchange resin or is added a mineral acid, to prepare a sol; the sol is gelated; and thereafter, the gel is dried under a supercritical condition of a solvent (Patent Document 2). The aerogels (silica aerogels) made by such methods have a fine silica framework, and therefore exhibit excellent mechanical strength despite their high porosity.

The known methods described above make it possible to manufacture an aerogel having a high porosity by drying and removing the dispersion medium in the gel under the supercritical condition of the dispersion medium and thereby replacing it with air while inhibiting drying shrinkage of the gel. However, since enormous costs are needed to realize the supercritical conditions, actual applications of the aerogels obtained through drying under the supercritical conditions are limited to those that are worth such high costs. Accordingly, a method of drying at atmospheric pressure for the purpose of cost reduction is suggested (Patent Document 3).

CITATION LIST

Patent Documents

Patent Document 1: U.S. Pat. No. 4,402,927
Patent Document 2: Japanese Patent Application Laid-Open (JP-A) No. H10-236817
Patent Document 3: JP-A No. H07-257918
Patent Document 4: JP-A No. 2002-500557

SUMMARY OF THE INVENTION

Problems to be Solved by the Invention

There are various applications of aerogels, including use as a core material of a vacuum heat insulator which utilizes high porosity and high mechanical strength of the aerogels, or as an additive for a heat insulation coating material which utilizes excellent heat insulating properties of the aerogels. In such applications, a shape of an aerogel particle is important. For example, in the case of using the aerogel as a core material of a vacuum heat insulator, it is important to reduce contribution of solid conduction in order to further improve the heat insulation properties of the aerogel, since convection does not contribute to thermal conduction. Use of globular particles makes it possible to reduce a contact area (point of contact) between the particles and to increase void among the particles, thus enabling inhibition of heat transfer via contact of the particles. Therefore, using globular aerogel particles as a core material of a vacuum heat insulator can further improve heat insulation properties of the vacuum heat insulator. In the application of the aerogel as an additive for a coating material, making the aerogel particles globular can improve a filling factor of the particles.

A suggested method of manufacturing a globular aerogel is: mixing an acid and an alkali metal silicate with a mixing nozzle; thereafter spraying the mixture; and making a droplet of the mixture directly into a gel (Patent Document 4). The particle size of the aerogel produced by this method is determined by the size of the droplet formed by the nozzle, and thus is about several hundred micrometers to several millimeters. On the other hand, in order to use the aerogel as a core material of a vacuum heat insulator or an additive for a coating material, it is preferable for the aerogel to have a globular shape and an average particle size of about 1 to 20 μm. However, it is very difficult to obtain such a small globular aerogel particles with a size of micrometer order by the spraying method described above.

In view of the above, an object of the present invention is to provide a method for efficiently manufacturing an aerogel with excellent heat insulation properties, an average particle size of about 1 to 20 μm and a globular particle shape. The present invention also provides an aerogel with excellent heat insulating properties, a particle size of about 1 to 20 μm and a globular particle shape.

Means for Solving the Problems

The inventors conducted intensive studies to solve the above problems, and as a result discovered that the above problems can be solved by: making an aqueous silica sol; dispersing the aqueous silica sol into another solvent that is immiscible with the solvent of the aqueous silica sol, to form a W/O emulsion; thereafter causing gelation of the aqueous silica sol; replacing the solvent of the silica gel with an organic solvent; hydrophobizing the surface of the silica gel; and drying the silica gel. Then they completed the present invention.

A first aspect of the present invention is a method for manufacturing an aerogel including the successive steps of:

(i) preparing an aqueous silica sol;

(ii) dispersing the aqueous silica sol into a hydrophobic solvent, thereby forming a W/O emulsion;

(iii) causing gelation of the silica sol, thereby converting the W/O emulsion into a dispersion of a gel;

(iv) replacing water in the gel with a solvent which has a surface tension at 20° C. of no more than 30 mN/m;

(v) treating the gel with a hydrophobing agent; and (vi) removing the solvent used in the replacing step (iv), wherein the hydrophobing agent is capable of reacting with a silanol group represented by the following formula (1) existing on the silica surface:

[Chemical Formula 1]

  (1)

(In the formula (1), the symbol "≡" represents remaining three valences of the Si atom.)

thereby converting the silanol group into a group represented by the following formula (2):

[Chemical Formula 2]

(≡Si—O—)$_{(4-n)}$SiR$_n$   (2)

(In the formula (2), n is an integer of 1 to 3; each R is independently a hydrocarbyl group; and two or more R may be the same or different from each other where n is 2 or more.)

In the present invention, the "hydrophobic solvent" refers to a solvent that can form a W/O emulsion. The "W/O emulsion" refers to an emulsion having aqueous droplets dispersed in the hydrophobic solvent.

In the first aspect of the present invention, the gelation of the silica sol is preferably caused by adding a base to the W/O emulsion.

In the first aspect of the present invention, the aqueous silica sol prepared preferably has a concentration of 20 g/L to 160 g/L as $SiO_2$ content based on Si content of the aqueous silica sol.

A second aspect of the present invention is an aerogel having: a specific surface area by BET method of 400 m$^2$/g to 1000 m$^2$/g; a pore volume by BJH method of 3 mL/g to 8 mL/g; a peak pore radius by BJH method of 10 nm to 30 nm; an average particle size by image analysis method of 1 μm to 20 μm; and an average circularity by image analysis method of no less than 0.8.

In the present invention, the "specific surface area by BET method" means a value determined by: drying a sample for measurement at 200° C. for no less than three hours under a reduced pressure of no more than 1 kPa; thereafter measuring an adsorption isotherm of only nitrogen adsorption at liquid nitrogen temperature; and analyzing the adsorption isotherm by the BET method. The pressure range used for the analysis is relative pressure of 0.1 to 0.25. The "pore volume by BJH method" refers to a pore volume which derives from a pore having a pore radius of 1 nm to 100 nm obtained by analyzing, by the BJH method (Barrett, E. P.; Joyner, L. G.; Halenda, P. P., J. Am. Chem. Soc. 73, 373 (1951)), the adsorption isotherm of the adsorption side obtained in the same manner as above. The "peak pore radius by BJT method" refers to a value of a pore radius which gives a peak in a pore distribution curve (volume distribution curve) which is plotted taking on the vertical axis differentiation of the cumulative pore volume by the logarithm of the pore radius obtained by analyzing by the BJH method the adsorption isotherm of the adsorption side obtained in the same manner as above, and taking the pore radius on the horizontal axis.

In the present invention, the "average particle size by image analysis method" is an arithmetic mean of equivalent circle diameters obtained by image analysis of a scanning electron microscope (SEM) image of no less than 2000 aerogel particles observed at a magnification of 1000 by secondary electron detection using a scanning electron microscope (SEM). The "equivalent circle diameter" of each aerogel particle is a diameter of a circle having an area equal to the area (projected area) of the aerogel particle in the image. The "average circularity by image analysis method" is an arithmetic mean of circularity obtained by image analysis of the SEM image of no less than 2000 aerogel particles observed at a magnification of 1000 using SEM. The "circularity" of each aerogel particle is a value determined by the following formula (3).

[Formula 1]

$$C = \frac{4\pi S}{L^2} \quad (3)$$

In the formula (3), C represents a circularity. S represents an area (projected area) of the aerogel particle in the image. L represents a length of a periphery (perimeter) of the aerogel particle in the image.

The aerogel of the second aspect of the present invention preferably has been treated by a hydrophobing agent.

Effects of the Invention

The method for manufacturing an aerogel of the first aspect of the present invention, in which gelation of the silica sol is caused in droplets of the W/O emulsion, enables efficient production of a globular aerogel which has an average particle size of about 1 to 20 μm, exhibits excellent heat insulation, and is suitably employed as a filler such as a core material of a vacuum heat insulator or as an additive. It is also possible to manufacture the aerogel of the second aspect of the present invention by the method.

The aerogel according to the second aspect of the present invention is excellent in heat insulation, has a particle size of 1 to 20 μm, and has a high spheroidicity, therefore exhibits excellent fluidity and filling performance. As such, it is very useful for such uses as fillers including a core material of a vacuum heat insulator, additives, and cosmetics, etc.

MODES FOR CARRYING OUT THE INVENTION

<1. Method for Manufacturing an Aerogel>

Figure 1:
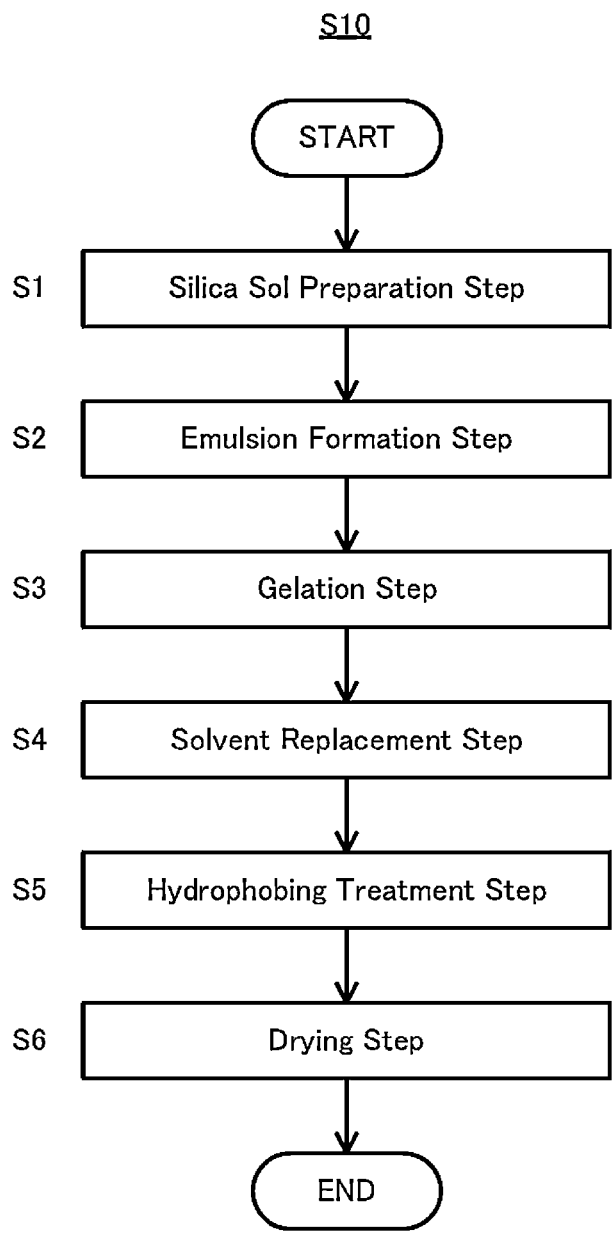
FIG. 1 is a flowchart describing the method for manufacturing an aerogel of the present invention.

The manufacturing method of an aerogel according to the first aspect of the present invention will be described. FIG. 1 is a flowchart describing the method S10 for manufacturing an aerogel of the present invention. As shown in FIG. 1, the method S10 for manufacturing an aerogel includes the successive six steps of:

(i) preparing an aqueous silica sol (silica sol preparation step S1);

(ii) dispersing the aqueous silica sol into a hydrophobic solvent, thereby forming a W/O emulsion (emulsion formation step S2);

(iii) causing gelation of the silica sol, thereby converting the W/O emulsion into a dispersion of a gel (gelation step S3);

(iv) replacing water in the gel with a solvent which has a surface tension at 20° C. of no more than 30 mN/m (solvent replacement step S4);

(v) treating the gel with a hydrophobing agent (hydrophobing step S5); and (vi) removing the solvent used in the replacing step (iv) (drying step S6). Each of the steps will be described below.

(Silica Sol Preparation Step S1)

The silica sol preparation step S1 (hereinafter sometimes simply referred to as "S1") may be carried out by adequately selecting a known method of preparing an aqueous silica sol.

Typical examples of the method of preparing an aqueous silica sol include: a method in which an alkali metal silicate or the like is used as a source material; and a method in which alkoxysilanes such as tetramethoxysilane or tetraethoxysilane is hydrolyzed. Among these methods, the method in which an alkali metal silicate is used may be favorably adopted since the source material is inexpensive. Examples of the alkali metal silicate include potassium silicate and sodium silicate; and the composition formula of the alkali metal silicate is represented by the following formula (4).
[Chemical Formula 3]

$$m(M_2O).n(SiO_2) \qquad (4)$$

(In the formula (4), m and n independently represent a positive integer; and M represents an alkali metal element.)

Among the source materials for preparing the silica sol, sodium silicate, which is easily available, is especially preferred.

In the case of using an alkali metal silicate such as sodium silicate as a source material for preparing the aqueous silica sol of the present invention, a silica sol can be prepared by, for example, neutralizing the alkali metal silicate by a mineral acid such as hydrochloric acid or sulfuric acid, or replacing alkali metal atoms in the alkali metal silicate with hydrogen atoms using a cation exchange resin having a proton ($H^+$) as a counter ion (hereinafter sometimes referred to as an "acid type cation exchange resin").

As the method of preparing a silica sol through neutralization by an acid, an aqueous solution of an alkali metal silicate may be added to an aqueous solution of an acid while the aqueous solution of the acid is stirred; or an aqueous solution of an acid and an aqueous solution of an alkali metal silicate may be mixed by collision in a piping (see Japanese Examined Patent Application Publication No. H04-54619, for example). The amount of acid used is preferably 1.05 to 1.2 as a mole ratio of a proton with respect to an alkali metal of the alkali metal silicate. With the amount of acid in this range, the pH of the silica sol becomes around 1 to 3.

Preparation of the silica sol by using an acid type cation exchange resin can also be performed by a known method. For example, making an aqueous solution of an alkali metal silicate having a proper concentration pass through a tower filled with the acid type cation exchange resin; or adding an acid type cation exchange resin to an aqueous solution of an alkali metal silicate and mixing them, thereby making alkali metal ions be chemically adsorbed onto the cation exchange resin to remove them from the solution, and thereafter separating the acid type cation exchange resin off by filteration or the like. When preparing the silica sol using an acid type cation exchange resin, the amount of the acid type cation exchange resin used needs to be no less than the amount that enables exchange of the alkali metal contained in the solution.

Known acid type cation exchange resins may be employed as the acid type cation exchange resin described above without particular limitations. For example, ion exchange resins such as styrene-based, acrylic, and methacrylic ones having sulfo groups or carboxyl groups as ion exchange groups, may be employed. Among them, the strong acid type cation exchange resins having sulfo groups may be favorably employed.

The acid type cation exchange resin described above can be regenerated by a known method, for example, making the resin contact with sulfuric acid or hydrochloric acid after the resin is used for the exchange of the alkali metal. The amount of acid used for the regeneration is usually twice to ten times more than the exchange capacity of the ion exchange resin.

The concentration of the aqueous silica sol prepared by the above method is preferably 20 g/L or more, more preferably 40 g/L or more, and especially preferably 50 g/L or more as silica concentration (concentration in terms of $SiO_2$), since such concentration makes it possible to complete gelation of the silica sol in relatively short time, and to inhibit shrinkage upon drying with sound formation of the framework structure of the aerogel thereby making it easy to obtain an aerogel with a large pore volume. On the other hand, the concentration is preferably 160 g/L or less, more preferably 120 g/L or less, and especially preferably 100 g/L or less, since such concentration makes it possible to reduce the thermal conduction (solid conduction) by the silica framework itself by relatively reducing the density of the aerogel, and thereby makes it easy to attain favorable heat insulation performance. With the concentration of the aqueous silica sol at no less than the above lower limit, it is possible to easily make the pore volume of the aerogel by the BJH method no less than 3 mL/g, and also possible to easily make the peak pore radius of the aerogel by BJH method no less than 10 nm. In addition, with the concentration of the aqueous silica sol at no more than the above upper limit, it is possible to easily make the pore volume of the aerogel by the BJH method no more than 8 mL/g, and also possible to easily make the peak pore radius of the aerogel by the BJH method no more than 30 nm.

(Emulsion Formation Step S2)

The emulsion formation step S2 (hereinafter, sometimes simply referred to as S2) is a step of dispersing the aqueous silica sol obtained in S1 into a hydrophobic solvent to form a W/O emulsion. Namely, an emulsion is formed with the above aqueous silica sol as a dispersoid and with the hydrophobic solvent as a dispersion medium. Forming such a W/O emulsion allows the silica sol as a dispersoid to become globular by surface tension etc., and thus makes it possible to obtain a globular gel product by causing gelation of the silica sol dispersed in the hydrophobic solvent in the globular shape. In this way, through the step S2 of forming a W/O emulsion, it is possible to produce an aerogel having a high circularity of no less than 0.8.

As long as the hydrophobic solvent has enough hydrophobicity to form the aqueous silica sol and the W/O emulsion, it works in the present invention. Examples of such a hydrophobic solvent are organic solvents such as hydrocarbons and halogenated hydrocarbons. More specifically, the examples are: hexane, heptane, octane, nonane, decane, dichloromethane, chloroform, carbon tetrachloride, dichloropropane, etc. Among them, hexane, which has moderate viscosity, is especially preferred. If necessary, two or more solvent may be used as a mixture. Hydrophilic solvents such as lower alcohols may also be used in combination (as a mixed solvent), to the extent that allows formation of the aqueous silica sol and the W/O emulsion.

The amount of hydrophobic solvent used is not particularly limited as long as it allows formation of a W/O emulsion, but in general the amount of hydrophobic solvent used is approximately 1 to 10 parts by volume based on 1 part by volume of the aqueous silica sol.

In the present invention, it is preferable to add a surfactant when forming the W/O emulsion described above. Any anionic surfactant, cationic surfactant, and nonionic surfactant may be used. Among them, nonionic surfactants are preferred in that the W/O emulsion can be easily formed. In the present invention, since the silica sol is aqueous, a surfactant which has an HLB of 3 to 5 can be favorably employed. The HLB indicates the degree of hydrophilicity and hydrophobicity of the surfactant. In the present invention, the "HLB" refers to an HLB value by Griffin's method. As mentioned above, in the present invention, the shape of the aerogel particle is almost determined by the shape of the droplet of the W/O emulsion. With the use of a surfactant having an HLB in the above range, it is possible to easily keep the W/O emulsion stable. Thus, it is possible to easily make the particle size of the aerogel 1 μm to 20 μm and also possible to easily make the particle size distribution of the aerogel more uniform. Specific examples of the surfactant that can be favorably employed include sorbitan monooleate, sorbitan monostearate, and sorbitan monosesquioleate.

The amount of surfactant used is the same as an amount usually employed to form a W/O emulsion. Specifically, the amount thereof is preferably 0.05 g to 10 g per 100 mL of the aqueous silica sol. If the amount of surfactant is large, the droplets of the W/O emulsion tend to be even smaller. On the other hand, if the amount of surfactant is small, the droplets of the W/O emulsion tend to be larger. As such, the average particle size of the aerogel can be adjusted by increasing or decreasing the amount of surfactant used.

A known W/O emulsion formation method can be employed to make the aqueous silica sol dispersed into the hydrophobic solvent when forming the W/O emulsion. In view of easy industrial production, it is preferable to carry out emulsification using an emulsifying machine. In specific, a mixer, a homogenizer, or the like may be used. A homogenizer may be preferably employed. Dispersion strength and dispersion time is preferably adjusted so that the average particle size of the silica sol droplets dispersed becomes 1 μm to 20 μm, which is a range of the average particle size of the aerogel of the present invention. It is because the average particle size of the silica sol droplets in the W/O emulsion generally corresponds to the average particle size of the aerogel. At the same time, reducing the particle size of the silica sol droplets in the emulsion sufficiently in this way makes it possible to prevent the shape of the silica sol droplets from being disturbed, and therefore makes it even easier to obtain a globular aerogel having a higher circularity.

(Gelation Step S3)

The gelation step S3 (hereinafter sometimes simply referred to as "S3") is a step of causing gelation of the aqueous silica sol in the state where the droplets of the aqueous silica sol are dispersed in the hydrophobic solvent, following the formation of the W/O emulsion in S2 above. The gelation can be caused by a known method. The gelation can be easily caused for example by heating the W/O emulsion to high temperature or adjusting the pH of the silica sol to be weakly acidic or basic. The gelation by the pH adjustment is preferred since it allows prompt gelation at low energy costs.

The pH adjustment can be easily done by adding a base to the W/O emulsion while stirring the emulsion by a mixer or the like as above to maintain the state of the W/O emulsion. Specific examples of the base include: ammonia; tetraalkylammonium hydroxides such as tetramethylammonium hydroxide (TMAH); amines such as trimethylamine; alkali hydroxides such as sodium hydroxide; alkali metal carbonates such as sodium carbonate and sodium bicarbonate; and alkali metal silicates. When the pH adjustment is performed by adding an alkali metal silicate, the concentration of the aqueous silica sol in the present invention refers to the total concentration of the silica source used in the preparation of the aqueous silica sol (S1) and the silica component derived from the alkali metal silicate used in the pH adjustment. The strength of the stirring mentioned above is sufficient as long as it allows the W/O emulsion and the base to mix with each other.

Among the above bases, ammonia, tetraalkylammonium hydroxides, or amines are preferably employed, since they do not bring metal element into the emulsion and do not make washing with water necessary, and ammonia is especially preferably employed. In the case of using ammonia, it may be introduced into the W/O emulsion as ammonia gas, or it may be added to the W/O emulsion as aqueous ammonia. Adding aqueous ammonia is more preferred in that fine adjustment of the pH can be easily made.

The method of adjusting the pH by using an alkali metal silicate is advantageous in that using the same alkali metal silicate in the preparation of the above aqueous silica sol makes an additional facility for the alkali unnecessary.

The pH adjustment in the gelation step is preferably carried out by determining in advance the amount of base that allows a desired pH and adding the base in that amount to the W/O emulsion. The determination of the amount of base that allows a desired pH can be done by separating a certain amount of sol to be used for the W/O emulsion, adding a base for the gelation while measuring the pH by a pH meter, and measuring the amount of the base that allows the desired pH.

Although the time needed for the gelation described above depends on the temperature and the concentration of the aqueous silica sol, when the pH is adjusted to be 5 in a system at 50° C. with a silica concentration in the silica sol being 80 g/L for example, gelation occurs several minutes after the pH adjustment and affords a dispersion having gel products dispersed in the hydrophobic solvent. In the present invention, the "gel product" includes not only a silica framework produced by the gelation in this manner but also a liquid component contained in the silica framework.

Since the dispersoid changes from liquid to solid after the gelation, the system is no longer the W/O emulsion but is a dispersion (suspension) having a solid (gel product) dispersed in the hydrophobic solvent.

(Solvent Replacement Step S4)

The solvent replacement step S4 (hereinafter sometimes simply referred to as "S4") is a step of replacing water in the gel obtained through S1 to S3 above, with a solvent which has a surface tension (γ) at 20° C. of no more than 30 mN/m (hereinafter, the step may be referred to as "solvent replacement" and the solvent that finally exists in the gel may be referred to as a "final solvent"). It is because if a solvent having a large surface tension remains in the gel, drying shrinkage tends to easily occur upon drying, and therefore an aerogel cannot be obtained by drying under non-critical conditions.

(Separation/Washing Step Before Solvent Replacement S4-1)

In S4, the gel (or aqueous phase containing the gel) is separated from the dispersion and washed, as a pretreatment before the water is replaced with a final solvent.

So as to separate the gel, a known separation method for collecting a solid component from a dispersion may be adopted. In specific, any one of addition of a salt, application of centrifugal force, addition of an acid, filtration, and changing a volume ratio (addition of water or a hydrophobic solvent), or any combination of them, may be adopted. Addition of a salt and/or changing a volume ratio can be preferably adopted. For example, the dispersion can be separated into the hydrophobic solvent phase and the aqueous phase including the gel by adding a certain amount of brine into the dispersion. The aqueous phase is collected by separating the hydrophobic solvent phase and the aqueous phase from each other by a known separation method such as decantation, etc. Then the gel included in the aqueous phase can be washed.

Impurities such as alkali metal (salt) derived from the source material or the component used in the pH adjustment can be removed by washing the gel. The gel is preferably washed until the electric conductivity of the washings becomes no more than 500 μS/cm, preferably no more than 200 μS/cm.

Washing of the gel can be performed by a known method of washing general powder granules. An example of such methods is repeating the steps of: adding a certain amount of water to the gel; letting it stand for a certain time; and thereafter removing the washing water. As another example, passing a certain amount of water through the gel put in a funnel or a column etc., can be raised. In the case of washing the gel using a column, the washing can be performed while applying pressure of around 0.2 MPa to 1.0 MPa to increase the flow rate, in order to improve efficiency.

(Main Step of Solvent Replacement S4-2)

As described above, in the method for manufacturing an aerogel of the present invention, the solvent replacement needs to be carried out. The solvent replacement is to replace the water contained in the gel with a solvent (final solvent) having a small surface tension so that drying shrinkage will not occur when the gel obtained by the above method is dried in the drying step described below.

A compound having a hydroxy group such as methanol and ethanol may be employed as the final solvent. However, if a solvent having a functional group that is likely to cause nucleophilic substitution reaction, such as a hydroxy group, a thiol group, and an amino group, or a solvent having an acidic group such as a carboxy group is used, reaction efficiency of hydrophobization in the hydrophobing step described below will decrease, and thus in some cases a large amount of hydrophobing agent can be required or higher temperature and longer time can be required to complete the reaction, which is often economically disadvantageous.

As such, it is preferable to use, as the final solvent, a solvent that does not have such a highly reactive functional group as above. However, solvents not having such a functional group as above generally have very low mutual solubility with water. It is thus generally difficult to replace the water contained in the gel with the final solvent directly. Accordingly, the solvent replacement is usually carried out in two steps including pre-replacement. A criterion in selecting a solvent to use in the pre-replacement is for example high mutual solubility with both water and the final solvent. Specific examples of the solvent to use in the pre-replacement are so called hydrophilic organic solvents, which are miscible with water at an arbitrary ratio, such as methanol, ethanol, isopropylalcohol, and acetone; and methanol or ethanol can be favorably used.

After the liquid component in the gel is replaced with a hydrophilic organic solvent by the pre-replacement, the hydrophilic organic solvent is replaced with the solvent (final solvent) having a small surface tension. The surface tension (γ) of the final solvent needs to be no more than 30 mN/m at 20° C., preferably no more than 25 mN/m at 20° C., and especially preferably no more than 20 mN/m at 20° C.

Specific examples of such a final solvent are as follows (the surface tension at 20° C. is indicated in the bracket; the unit is $[10^{-3}$ N/m]): aliphatic hydrocarbons such as pentane (15.5), hexane (18.4), heptane (20.2), octane (21.7), 2-methylpentane (17.4), 3-methylpentane (18.1), 2-methylhexane (19.3), cyclopentane (22.6), cyclohexane (25.2), and 1-pentene (16.0); aromatic hydrocarbons such as benzene (28.9), toluene (28.5), m-xylene (28.7), and p-xylene (28.3); halogenated hydrocarbons such as dichloromethane (27.9), chloroform (27.2), carbon tetrachloride (26.9), 1-chloropropane (21.8), and 2-chloropropane (18.1); ethers such as ethyl ether (17.1), propyl ether (20.5), isopropyl ether (17.7), butyl ethyl ether (20.8), and 1,2-dimethoxyethane (24.6); ketones such as acetone (23.3), methyl ethyl ketone (24.6), methyl propyl ketone (25.1), and diethyl ketone (25.3); and esters such as methyl acetate (24.8), ethyl acetate (23.8), propyl acetate (24.3), isopropyl acetate (21.2), isobutyl acetate (23.7), and ethyl butyrate (24.6).

Among the above examples of the solvent, in view of small surface tension and low toxicity etc., aliphatic hydrocarbons are preferred, and hexane is most preferred.

Among the above solvents, use of a solvent highly miscible with water such as acetone, methyl ethyl ketone, and 1,2-dimethoxyethane is advantageous in that the pre-replacement described above is unnecessary.

In addition, solvents having a boiling point under atmospheric pressure of no more than 100° C. are preferred in that they can be easily dried in the drying step described below.

The pre-replacement can be performed by a known method. An example of such method is repeating the steps of: adding a certain amount of solvent to the gel; letting it stand for a certain time; and thereafter removing the solvent. As another example, passing a certain amount of the solvent through the gel put in a column, can be raised. In order to save the solvent used in the replacement, the method using a column is preferred. When carrying out the replacement using a column, pressure of around 0.2 to 1.0 MPa can be applied to increase the flow rate, in order to improve the efficiency.

The amount of solvent used for the pre-replacement is preferably such amount that it can sufficiently replace water in the gel. The water content in the gel after the replacement is preferably no more than 10 mass % with respect to the silica content. In the case of adopting the method using a column, it is possible to attain the above water content by using a solvent in an amount which is three to ten times, preferably five to ten times more than the volume of the gel in the column.

Another solvent replacement may also be performed between the pre-replacement and the replacement with the final solvent, if necessary.

The solvent replacement (final replacement) in which the hydrophilic organic solvent is replaced with the final solvent can be performed in the same manner as in the pre-replacement, and is performed using such amount of the solvent that can sufficiently replace the solvent used in the pre-replacement (or the solvent used in additional replacement performed between the pre-replacement and the final replacement). In the case of adopting the above method using a column, it is possible to attain sufficient replacement by using a solvent in an amount which is three to ten times, preferably five to ten times more than the volume of the gel in the column.

Upon completion of the replacement of the liquid component in the gel with the final solvent, there exist many silanol groups (Si—OH groups) on the surface of the silica framework in the gel, and therefore the gel can easily absorb water. Therefore, it is desirable to keep the entire gel immersed in the final solvent so that it will not be left exposed to the atmosphere for a long time until the subsequent surface hydrophobing step is carried out.

The solvent used for the solvent replacement including the pre-replacement and the final replacement is preferably collected, purified by distillation etc., and thereafter reused, in order to save costs for the solvent.

(Hydrophobing Step S5)

The hydrophobing step S5 (hereinafter sometimes simply referred to as "S5") is a step of carrying out a hydrophobing treatment after carrying out the solvent replacement with the final solvent. In the hydrophobing treatment, a hydrophobing agent is used which is capable of reacting with a silanol group represented by the following formula (1) existing on the silica surface:

[Chemical Formula 4]

$$\equiv\text{Si—OH} \quad (1)$$

(In the formula (1), the symbol "≡" represents remaining three valences (atomic valence) of the Si atom, and does not mean Si atom is involved in a triple bond.)
thereby converting the silanol group into a group represented by the following formula (2):

[Chemical Formula 5]

$$(\equiv\text{Si—O—})_{(4-n)}\text{SiR}_n \quad (2)$$

(In the formula (2), n is an integer of 1 to 3; each R is independently a hydrocarbyl group; and two or more R may be the same or different from each other where n is 2 or more.)

Carrying out the hydrophobing treatment by using such a hydrophobing agent causes the silanol group on the silica surface to be endcapped by a hydrophobic silyl group and deactivated, and therefore makes it possible to inhibit dehydration condensation reaction between the silanol groups on the surface. Thus drying shrinkage can be inhibited even when drying is performed under conditions which fall short of the critical point, and therefore it is made possible to obtain an aerogel having a porosity of no less than 60% and a pore volume of no less than 3 mL/g. It is also made easy to make the specific surface area of the aerogel no less than 400 m²/g.

Compounds represented by the following formulae (5) to (7) are known as such hydrophobing agents as described above.

[Chemical Formula 6]

$$R_n\text{SiX}_{(4-n)} \quad (5)$$

(In the formula (5), n represents an integer of 1 to 3; R represents a hydrocarbyl group; X represents a group (i.e. a leaving group) which can leave a molecule by cleavage of bond with the Si atom in a reaction with a compound having a hydroxyl group; each R may be different where n is 2 or more; and each X may be different where n is 2 or less.)

[Chemical Formula 7]

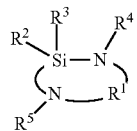

(6)

(In the formula (6), $R^1$ represents an alkylene group; $R^2$ and $R^3$ independently represent a hydrocarbyl group; and $R^4$ and $R^5$ independently represent hydrogen atom or a hydrocarbyl group.)

[Chemical Formula 8]

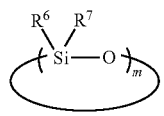

(7)

(In the formula (7), $R^6$ and $R^7$ independently represent a hydrocarbyl group; m represents an integer of 3 to 6; each $R^6$ may be different when there are two or more $R^6$; and each $R^7$ may be different when there are two or more $R^7$.)

In the above formula (5), R is a hydrocarbyl group, preferably a hydrocarbyl group having a carbon number of 1 to 10, more preferably a hydrocarbyl group having a carbon number of 1 to 4, and especially preferably a methyl group.

Examples of the leaving group represented by X include: halogen atoms such as chlorine and bromine; alkoxy groups such as methoxy group and ethoxy group; groups represented by —NH—SiR₃ (wherein definition of R is the same as that of R in the formula (5)).

Specific examples of the hydrophobing agent represented by the above formula (5) include: chlorotrimethylsilane, dichlorodimethylsilane, trichloromethylsilane, monomethyltrimethoxysilane, monomethyltriethoxysilane, and hexamethyldisilazane. In view of favorable reactivity, chlorotrimethylsilane, dichlorodimethylsilane, trichloromethylsilane, and/or hexamethyldisilazane are especially preferred.

The number of bond of the Si atom with the silanol group on the silica framework varies depending on the number (4-n) of the leaving group X. For example, if n is 2, the following bonding will occur:

[Chemical Formula 9]

$$(\equiv\text{Si—O—})_2\text{SiR}_2 \quad (8)$$

If n is 3, the following bonding will occur:

[Chemical Formula 10]

$$\equiv\text{Si—O—SiR}_3 \quad (9)$$

In this manner, the silanol groups are silylated, and thereby hydrophobization is done.

In the above formula (6), $R^1$ is an alkylene group, preferably an alkylene group having a carbon number of 2 to 8, and especially preferably an alkylene group having a carbon number of 2 to 3.

In the above formula (6), $R^2$ and $R^3$ are independently a hydrocarbyl group, and the same preferable groups as those of R in the formula (5) can be raised. $R^4$ represents hydrogen atom or a hydrocarbyl group, and when it is a hydrocarbyl group, the same preferable groups as those of R in the formula (5) can be raised. When the gel is treated with the compound (cyclic silazane) represented by the formula (6), cleavage of Si—N bonds will occur by the reaction with silanol groups, and therefore the following bonding will occur on the surface of the silica framework in the gel:

[Chemical Formula 11]

$$(\equiv\text{Si—O—})_2\text{SiR}^2\text{R}^3 \quad (10)$$

In this way, the silanol group is silylated by the cyclic silazanes of the above formula (6) as well, and thereby hydrophobization is done.

Specific examples of the cyclic silazanes represented by the above formula (6) include hexamethylcyclotrisilazane, and octamethylcyclotetrasilazane.

In the above formula (7), $R^6$ and $R^7$ are independently a hydrocarbyl group, and the same preferable groups as those of R in the formula (5) can be raised. m represents an integer of 3 to 6. When the gel is treated with the compound (cyclic siloxane) represented by the formula (7), the following bonding will occur on the surface of the silica framework in the gel:

[Chemical Formula 12]

$$(\equiv\text{Si—O—})_2\text{SiR}^6\text{R}^7 \quad (11)$$

In this way, silanol groups are silylated by the cyclic siloxanes of the above formula (7) as well, and thereby hydrophobization is done.

Specific examples of the cyclic siloxanes represented by the above formula (7) include hexamethylcyclotrisiloxane, octamethylcyclotetrasiloxane, and decamethylcyclopentasiloxane.

Although the amount of the hydrophobing agent used in the hydrophobing treatment depends on the type of the hydrophobing agent, when dimethyldichlorosilane is used as the hydrophobing agent for example, the amount thereof is preferably 50 to 150 parts by weight per 100 parts by weight of dry weight of silica.

As for the conditions of the hydrophobing treatment, conditions of known methods to treat the silica surface with a hydrophibing agent in an organic solvent can be adequately selected in accordance with the nature of the hydrophibing agent employed. An example involves successive steps of: adjusting the amount of final solvent such that the concentration of the gel after the solvent replacement treatment (S4) in the final solvent becomes the concentration which enables formation of a dispersion (suspension) by stirring; adding a hydrophobing agent to the dispersion; stirring the dispersion well to make the hydrophobing agent diffused all over the system; and thereafter keeping the system reacting for a certain time. For example, when dimethyldichlorosilane is used as the hydrophobing agent and the treating temperature is 50° C., the reaction can almost complete after the dispersion is kept for about 12 hours or more.

Even after completion of the reaction as described above, there may remain some of the hydrophobing agent unreacted. Therefore, it is preferable to remove the unreacted hydrophobing agent by washing the gel before the subsequent drying step. The removal of the unreacted hydrophobing agent by washing can be done by separating the gel by filtration and washing the solid component filtered once or several times with the final solvent or another solvent that meets the requirements for the final solvent described above.

(Drying Step S6)

The drying step S6 (hereinafter sometimes simply referred to as "S6") is a step of removing (drying) the final solvent after the hydrophobing treatment in S5 above. Through S6, a final aerogel can be obtained. The drying temperature is preferably no less than the boiling point of the final solvent used and no more than the decomposition temperature and the cleavage temperature of the silyl group derived from the hydrophobing agent existing on the silica surface, and usually room temperature to around 200° C. The drying is preferably performed under atmospheric pressure or under reduced pressure.

If the final solvent used in S4 or S5 has a high boiling point low volatility), the drying may be performed after replacing it with another solvent having a lower boiling point. Obviously, the solvent to be used in this case needs to meet the requirements for the final solvent described above, that is, needs to have a small surface tension.

(Properties and Uses)

The aerogel thus obtained has a globular particle shape. In addition, an average particle size of the aerogel by image analysis method using a scanning electron microscope (SEM) is usually 1 µm or more and 20 µm or less. BET specific surface area of the aerogel is usually 400 $m^2/g$ or more, or in some cases 600 $m^2/g$ or more. A porosity of the aerogel is usually 60% or more, in many cases 70% or more, or in some cases 80% or more. A pore volume of the aerogel by the BJH method is usually 4 mL/g or more, or in many cases 5 mL/g or more. A peak pore radius of the aerogel by the BJH method is usually 10 nm or more and 30 nm or less.

In the present invention, the "globular" particle shape means that an average circularity by image analysis method using a scanning electron microscope (SEM) is no less than 0.8. The circularity is especially preferably no less than 0.85. In addition, the aerogel particle obtained by the method for manufacturing an aerogel of the present invention described above usually does not have a corner in an image of the particle obtained by SEM observation at a magnification of 1000.

The globular aerogel having the above properties can be used, because of its characteristics, as a heat insulator, a core material of a vacuum heat insulator, an additive for a coating material, a cosmetic product, an antiblocking agent, and the like.

In the above descriptions of the present invention, the method S10 of manufacturing an aerogel has been explained in which the solvent replacement step S4 is carried out after the gelation step S3 without aging the gel, as an example. However, the present invention is not limited to this configuration. The method for manufacturing an aerogel may further include a step of aging the gel after the gelation step. The specific surface area of the finally obtained aerogel changes depending on the pH, the temperature, and the time applied in the aging step. While the specific surface area of the aerogel decreases as the pH, the temperature, and the time for the aging step increases, advantageous effects of inhibiting the drying shrinkage and increasing the pore volume can be attained since the framework structure of the aerogel becomes stronger. Thus, the conditions may be adequately determined based on such factors as the intended use of the globular aerogel manufactured and the properties of the aerogel required for the intended use.

The aging temperature is preferably 30° C. to 80° C. If the aging temperature is higher than this range, a large amount of heat will be needed to increase the temperature. If the aging temperature is lower than this range, longer time will be needed to attain the aging effects. The length of aging time is not particularly limited and can be adequately determined in consideration of the above functions of aging. An example of preferable aging time is 0.5 to 24 hours.

In the above descriptions on the present invention, the method S10 of manufacturing an aerogel has been explained in which in the solvent replacement step S4 the gel is washed after the aqueous phase is separated from the dispersion of the gel, but the present invention is not limited to this configuration. In the method for manufacturing an aerogel, the gel in the dispersion may be washed without separation of the aqueous phase from the dispersion of the gel. However, in the case of washing the gel without separating the aqueous phase, tremendous efforts will be needed for the washing since the contact between the aqueous phases is small in the state of the suspension where the gel is dispersed in the hydrophobic solvent. Therefore, in view of reducing time and costs spent for washing, it is preferable to wash the gel after separating the aqueous phase from the dispersion of the gel as described above.

In the above descriptions on the present invention, the method S10 of manufacturing an aerogel has been explained in which in the solvent replacement step S4 the solvent replacement is carried out after separation of the aqueous phase and washing of the gel, as an example. However, the present invention is not limited to this configuration. In the method for manufacturing an aerogel, the solvent replacement may be carried out without washing the gel. However, in order to reduce the amount of impurities such as alkali metal salts and to produce thereby an aerogel of higher purity, it is preferable to carry out the solvent replacement after washing the gel as described above.

<2. Aerogel>

The aerogel according to the second aspect of the present invention will be described.

The aerogel of the present invention has a specific surface area by the BET method of no less than 400 m$^2$/g, especially preferably no less than 600 m$^2$/g. In addition, the specific surface area of the aerogel by the BET method is no more than 1000 m$^2$/g, preferably no more than 800 m$^2$/g. Larger specific surface area means smaller primary particle size of the silica constituting the aerogel, which makes it possible to form the aerogel framework structure with a smaller amount of silica, and therefore it is more preferable in improving the heat insulation properties. With the BET specific surface area of no less than the above lower limit, sufficient heat insulation performance can be attained. On the other hand, it is difficult to obtain an aerogel having BET specific surface area larger than 1000 m$^2$/g.

The aerogel of the present invention has a pore volume by the BJH method of no less than 3 mL/g, especially preferably no less than 4 mL/g. The pore volume by the BJH method is no more than 8 mL/g, preferably no more than 6 mL/g. With a pore volume of 3 mL/g or more, it is possible to attain sufficient heat insulation performance. On the other hand, it is difficult to obtain an aerogel having a pore volume larger than 8 mL/g.

The peak pore radius of the aerogel of the present invention is 10 nm to 30 nm by analysis by the BJH method as above. While the mean free path of gas molecules is about 100 nm at 0° C. and 100 kPa, the peak pore diameter of the aerogel of the present invention is smaller than this, which allows effective inhibition of heat conduction by collision between gas molecules. If the peak pore radius by the BJH method is less than 10 nm, the density of the aerogel increases, and therefore heat conduction by solid conduction increases, causing degradation of the heat insulation performance. If the peak pore radius by the BJH method is larger than 30 nm, it becomes difficult to effectively inhibit the heat conduction by gas molecules, causing degradation of the heat insulation performance.

The average particle size of the aerogel of the present invention by the image analysis method is 1 μm to 20 μm. With the average particle size in this range, a void in an adequate size can be formed between the aerogel particles when the particles are packed. As such, when the aerogel is used as a core material of a vacuum heat insulator for example, it can exhibit excellent heat insulation performance.

The average circularity of the aerogel of the present invention by the image analysis method is no less than 0.8, and preferably no less than 0.85. With the average circularity at no less than the above lower limit, it is possible to effectively reduce the contact area between the aerogel particles. Therefore, when the aerogel is used as a core material of a vacuum heat insulator or for some other purposes, favorable heat insulation performance can be attained.

Preferably, the aerogel of the present invention having the properties described above has been treated by a hydrophibing agent. Such a hydrophobic aerogel can be manufactured efficiently for example by the method for manufacturing an aerogel according to the first aspect of the present invention described above.

EXAMPLES

Hereinafter, the present invention will be described in more detail based on Examples and Comparative Examples. However, the present invention is not limited to the Examples. In the Examples and the Comparative Examples below, measurement of the BET specific surface area, the pore volume by the BJH method, and the pore distribution by the BJH method was carried out using BELSORP-max manufactured by BEL Japan, Inc. Measurement of the thermal conductivity was carried out using HC-074-200 manufactured by EKO Instruments Co., Ltd. The bulk density was measured by the method (constant mass measurement method) prescribed in JIS R1628. The measurement values of the average particle size and the average circularity were obtained by image analysis of 2000 particles using an SEM image of the particles measured in secondary electron detection mode at a magnification of 1000. The average circularity was obtained by determining, by the above formula (3), circularity of each of 2000 particles observed by the above method, and taking arithmetic mean of the circularity values. The average particle size was obtained by observing 2000 particles using SEM by the above method, determining a diameter (equivalent circle diameter) of a circle having the same area as the area occupied by each particle in the SEM image, and taking arithmetic mean of the diameters.

Examples 1 to 7 and Comparative Examples 1 to 2

Example 1

An aqueous solution of JIS sodium silicate No. 3 (JIS K1408) was diluted to adjust the concentration to be SiO$_2$:80 g/L and Na$_2$O:27 g/L. The diluted solution of sodium silicate was passed through an ion exchange resin made to be of H$^+$ type by sulfuric acid in advance to prepare 500 mL of silica sol (the ion exchange resin: Amberlyst® IR-120B produced by Rohm and Haas Company). The pH of the silica sol was 2.8.

Out of the prepared silica sol, 100 mL thereof was taken; 0.1% ammonia water was added thereto while the pH was measured using a pH meter; and the amount of aqueous ammonia that made the pH become 6 was measured. The remaining 400 mL of silica sol was added to 600 mL of hexane; 0.8 g of sorbitan monooleate was added to the mixture; and the mixture was stirred at 11000 rpm for four minutes using a homogenizer (T25BS1 manufactured by IKA), to form a W/O emulsion. While the emulsion was stirred by a mixer, 0.1% aqueous ammonia in the amount which was four times the amount that had already been measured above was added to the emulsion, to adjust the pH of the sol to be 6. While the stirring was continued, the temperature of the emulsion was adjusted and kept to be 50° C. and the emulsion was aged for 24 hours. Thereafter, 400 mL of water was added to the emulsion; the aqueous phase was separated; then an aqueous dispersion of a gel was obtained.

The dispersion was put in a column, and the solvent was replaced with 2 L of ethanol, followed by replacement with 1.2 L of hexane. The gel was moved into a beaker; hexane was added to make the entire volume to be 800 mL; and then 40 g of chlorotrimethylsilane was added. Thereafter, the mixture was left standing for 24 hours at 50° C.

The hydrophobized gel was separated by vacuum filtration and washed with 800 mL of hexane. The gel was dried under atmospheric pressure under flow of nitrogen. The drying temperature and the drying time was: 3 hours at 40° C.; 2 hours at 50° C.; and then 12 hours at 150° C. 43 g of the aerogel was obtained after the drying. The properties of the aerogel thus obtained are shown in Table 1.

Example 2

An aqueous solution of JIS sodium silicate No. 3 (JIS K1408) was diluted with water to adjust the concentration to be $SiO_2$:150 g/L and $Na_2O$:51 g/L. In addition, sulfuric acid with a concentration of 103 g/L was prepared. The solution of sodium silicate and the 103 g/L sulfuric acid were mixed by collision at a flow rate of 10 m/s or more in a Y-shaped piping as described in Japanese Examined Patent Application Publication No. 4-54619, under the condition of 1.08 L/min for the solution of silicate of soda and 0.99 L/min for the sulfuric acid to afford a silica sol. The pH of the silica sol was 2.9.

To 100 mL of the silica sol, 5% aqueous ammonia was added while the pH was measured with a pH meter; and the amount of the 5% aqueous ammonia that made the pH become 6 was measured. Then, 600 mL of hexane was added to 400 mL of the silica sol; 1.6 g of sorbitan monooleate was added; and the mixture was stirred at 11000 rpm for four minutes by a homogenizer (T25BS1 manufactured by IKA), to form a W/O emulsion. At this time, the W phase formed in the emulsion was observed using an optical microscope (magnification of 400) and particle sizes of 1000 particles (a diameter of a circle having the same area as the area occupied by the particle seen in an optical microscope image) were measured and arithmetically averaged, which gave the average value of 8 μm and the standard deviation of 1.8 μm. While the emulsion was stirred by a mixer, 5% aqueous ammonia in the amount which was four times the amount that had already been measured above was added to the emulsion, to adjust the pH of the sol to be 6. After further 5 minutes stirring, 400 mL of water was added, and the aqueous phase was separated to afford an aqueous dispersion of a gel was obtained.

The dispersion was put in a column having a diameter of 7.5 cm, and was washed with 2 L of ion exchange water. The electrical conductivity of the washings which finally flowed out of the column was 42 μS/cm. Thereafter, the solvent was replaced with 2 L of ethanol, followed by replacement with 1.2 L of hexane. The gel was moved into a beaker; hexane was added to make the entire volume to be 800 mL; and then 40 g of chlorotrimethylsilane was added thereto. Thereafter, the gel was left standing for 24 hours at 50° C. to be hydrophobized.

Figure 2:
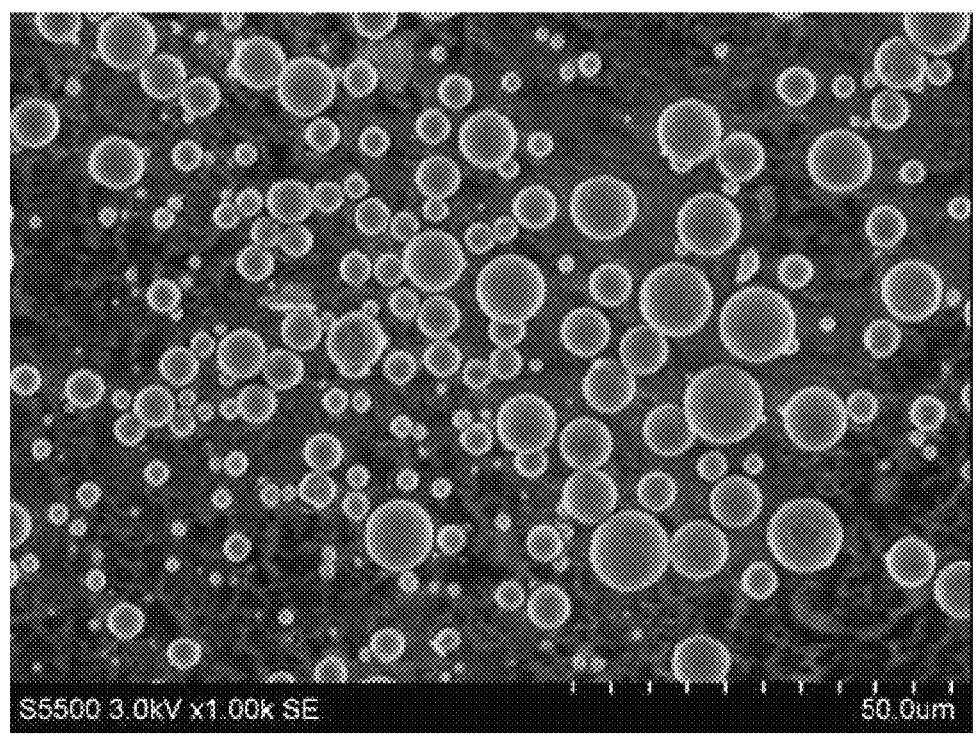
FIG. 2 is an SEM image of a globular aerogel of the present invention produced in Example 2.

The hydrophobized gel was separated by vacuum filtration and washed with 800 mL of hexane. The gel was dried under atmospheric pressure under flow of nitrogen. The drying temperature and the drying time was: 3 hours at 40° C.; then 2 hours at 50° C.; and thereafter 12 hours at 150° C. 43 g of the aerogel was obtained after the drying. The properties of the aerogel thus obtained are shown in Table 1. In addition, an SEM image (secondary electron detection mode) of the aerogel at a magnification of 1000 is shown in FIG. 2.

Example 3

An aerogel was obtained under the same conditions as in Example 2, except that: a solution of JIS sodium silicate No. 3 (JIS K1408) was diluted to adjust the concentration to be $SiO_2$:75 g/L and $Na_2O$:25.5 g/L; and 51.5 g/L sulfuric acid was used. 20 g of the aerogel was obtained after the drying. The properties of the aerogel thus obtained are shown in Table 1.

Example 4

An aerogel was obtained under the same conditions as in Example 2, except that 12 g of dichlorodimethylsilane was used in the surface hydrophobing treatment, instead of 40 g of chlorotrimethylsilane. The properties of the aerogel obtained are shown in Table 1.

Example 5

An aerogel was obtained under the same conditions as in Example 2, except that 14 g of trichloromethylsilane was used as a hydrophobing agent in the surface hydrophobing treatment, instead of 40 g of chlorotrimethylsilane. The properties of the aerogel obtained are shown in Table 1.

Example 6

An aerogel was obtained under the same conditions as in Example 2, except that: when forming a W/O emulsion, the homogenizer was operated at 11000 rpm for one minute. The properties of the aerogel obtained are shown in Table 1.

Comparative Example 1

By the same method as in Example 2, 400 mL of silica sol was prepared. The silica sol prepared was not subjected to the W/O emulsion formation step (hexane was not added to the silica sol), but 5% aqueous ammonia was directly added to the silica sol to adjust the pH to be 6. The sol gelated in less than one minute. The gel was pulverized in a moderate manner and passed through a 2-mm sieve.

The pulverized gel was put in a column and washed with 2 L of ion exchange water. The electrical conductivity of the washings which finally flowed out of the column was 54 μS/cm. Thereafter, the solvent was replaced with 2 L of ethanol, followed by solvent replacement with 1.2 L of hexane. After the gel was separated, hexane was added to the gel to make the entire volume to be 800 mL; and then, 40 g of chlorotrimethylsilane was added. Thereafter, the gel was left standing for 24 hours at 50° C.

The hydrophobized gel was separated by vacuum filtration and washed with 800 mL of hexane. The gel was dried under atmospheric pressure under flow of nitrogen. The drying temperature and the drying time was: 3 hours at 40° C.; then 2 hours at 50° C.; and thereafter 12 hours at 150° C. 42 g of the dry gel was obtained.

Figure 3:
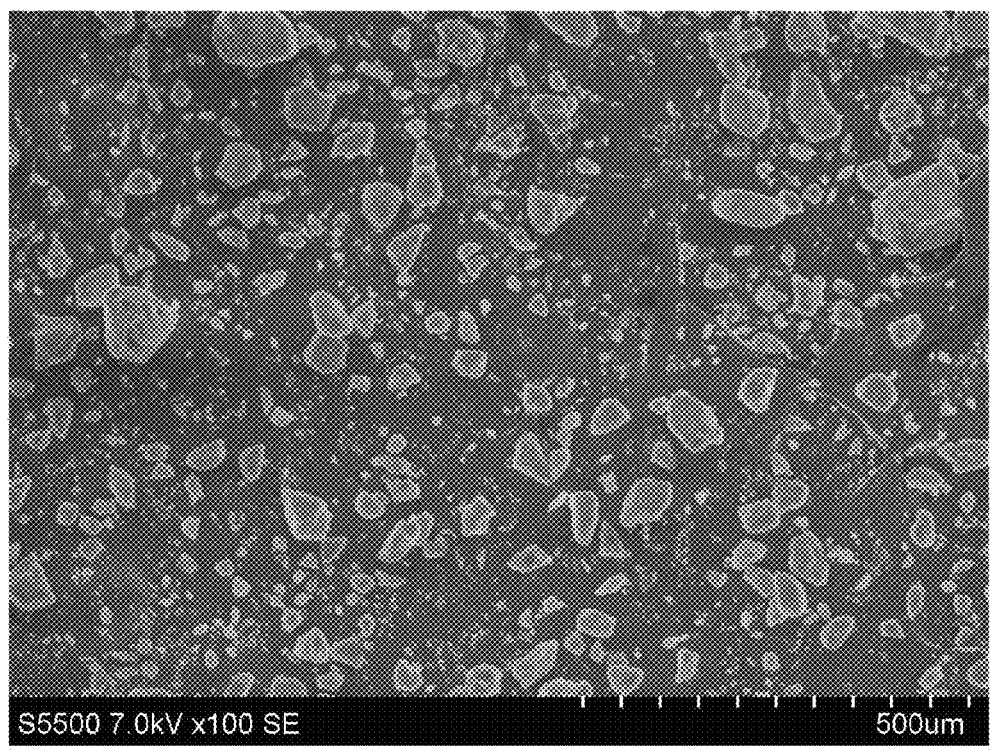
FIG. 3 is an SEM image of an aerogel produced in Comparative Example 1.

The dried gel was pulverized using a coffee mill to have a particle size of about 10 μm to 150 μm. The properties of the aerogel thus obtained are shown in Table 1 (the average particle size of the aerogel by the image analysis method was 22 μm; in the image analysis in Comparative Example 1, an SEM image at a magnification of 100 was used). The SEM image (secondary electron detection mode) of the aerogel at a magnification of 100 is shown in FIG. 3.

Comparative Example 2

An aerogel was made under the same conditions as in Example 2, except that the drying treatment was performed without hydrophobing treatment. The properties of the dry aerogel obtained are shown in Table 1.

TABLE 1

|  | Specific Surface Area (m²/g) | Pore Volume (ml/g) | Pore Radius (nm) | Average Particle Size (μm) | Standard Deviation of Particle Size (μm) | Circularity | Thermal Conductivity (mW/mK) | Bulk Density (g/L) |
|---|---|---|---|---|---|---|---|---|
| Example 1 | 410 | 4.0 | 18 | 9 | 1.5 | 0.86 | 22 | 124 |
| Example 2 | 710 | 5.6 | 22 | 8 | 1.8 | 0.90 | 20 | 120 |
| Example 3 | 699 | 4.5 | 25 | 8 | 1.8 | 0.87 | 20 | 43 |
| Example 4 | 772 | 3.7 | 19 | 8 | 1.9 | 0.86 | 20 | 104 |
| Example 5 | 720 | 3.2 | 13 | 8 | 1.9 | 0.88 | 21 | 130 |
| Example 6 | 716 | 5.8 | 24 | 17 | 4.2 | 0.84 | 23 | 114 |
| Comparative Example 1 | 440 | 4.5 | 22 | 22 | 18 | Broken | 21 | 71 |
| Comparative Example 2 | 630 | 2.3 | 10 | 6 | 1.2 | 0.88 | 36 | 181 |

<Evaluation Results>

(Examples 1 to 6)

As shown in Table 1, in Examples 1 to 6, aerogels having an average particle size of 1 μm to 20 μm with a high circularity of 0.8 or more could be produced. All of these aerogels had: a BET specific surface area of 400 m²/g to 1000 m²/g; a pore volume by the BJH method of 3 mL/g to 8 mL/g; and a peak pore radius by the BJH method of 10 nm to 30 nm. In addition, as shown in FIG. 2, the aerogel particles observed at magnification of 1000 using SEM were almost globular and did not have a corner.

(Example 2)

As shown in Table 1, the average particle size of the aerogel particle in Example 2 was 8 μm, which was equal to the average particle size (8 μm) of the droplet of the W/O emulsion measured above. This indicates that the shape of the droplet of the W/O emulsion determines the final shape of the aerogel particle finally obtained. It can be understood from this result that the average particle size of the aerogel finally obtained can be controlled as desired by controlling the droplet size of the W/O emulsion.

(Example 3)

The aerogel of Example 3, in which the silica concentration of the silica sol was half the silica concentration in Example 2, had a bulk density which was about one third of that of the aerogel in Example 2. In this way, the bulk density of the aerogel can be controlled by controlling the silica concentration of the silica sol.

(Comparative Example 1)

In Comparative Example 1, in which the silica sol was made into a gel directly without forming a W/O emulsion and the gel was pulverized, it was difficult to control the average particle size of the aerogel to be 1 μm to 20 μm. Further, since the gel had been crushed, the aerogel particles were not globular at all as shown in the SEM image of FIG. 2. The bulk density was about 40% less than that of the aerogel in Example 2. It is considered to be because the particles were more loosely filled than in the case of the globular particles since the particles were not globular at all as mentioned above.

(Comparative Example 2)

In the gel of Comparative Example 2, in which the drying treatment was performed without the hydrophobing treatment, the pore volume was less than 3 mL/g and was significantly less than that of the aerogel of Example 2 by as much as about 60%. The average particle size was 25% less than that of the aerogel particle in Example 2. Further, the thermal conductivity was as much as 180% of that of the aerogel of Example 2. The bulk density was as much as about 150% of that of the aerogel of Example 2. The significant decrease of the pore volume is considered to be because of collapse of many of the pores having a radius of 1 nm to 100 nm measurable by the BJH method, due to dehydration condensation reaction between the silanol groups and drying shrinkage of the silica, caused by free silanol groups on the silica surface not endcapped by the hydrophobic silyl group. It can be understood that since the pores to prevent convection decreased in this way and the bulk density increased due to the shrinkage, contribution of convection and solid conduction to the thermal conduction could not be inhibited, therefore resulting in increase in the thermal conductivity.

Industrial Applicability

The aerogel of the present invention can be favorably used as a filler such as a core material of a vacuum heat insulator or as an additive for a heat insulation coating material. Further, the method for manufacturing an aerogel of the present invention can be favorably employed in manufacturing such aerogels.

The invention claimed is:

1. A method for manufacturing an aerogel comprising the successive steps of:
    (i) preparing an aqueous silica sol;
    (ii) dispersing the aqueous silica sol into a hydrophobic solvent, thereby forming a W/O emulsion;
    (iii) causing gelation of the silica sol, thereby converting the W/O emulsion into a dispersion of a gel;
    (iv) replacing water in the gel with a solvent which has a surface tension at 20° C. of no more than 30 mN/m;
    (v) treating the gel with a hydrophobing agent; and
    (vi) removing the solvent used in the replacing step (iv),
    wherein the hydrophobing agent is capable of reacting with a silanol group represented by the following formula (1) existing on the silica surface:

[In the formula (1), the symbol "≡" represents remaining three valences of the Si atom;] thereby converting the silanol group into a group represented by the following formula (2):

[In the formula (2), n is an integer of 1 to 3; each R is independently a hydrocarbyl group; and two or more R may be the same or different with each other where n is 2 or more.]

2. The method for manufacturing an aerogel according to claim 1,
    wherein the gelation of the silica sol is caused by adding a base to the W/O emulsion.

3. The method for manufacturing an aerogel according to claim 1 or 2, wherein prepared said aqueous silica sol has a concentration of 20 g/L to 160 g/L as $SiO_2$ content based on Si content.

4. A silica aerogel having:

specific surface area by BET method of 400 m2/g to 1000 m2/g;

pore volume by BJH method of 3.7 mL/g to 8 mL/g;

peak pore radius by BJH method of 10 nm to 30 nm;

average particle size by image analysis method of 1 μm to 20 μm; and average circularity by image analysis method of no less than 0.8.

5. The silica aerogel according to claim 4, wherein the aerogel has been treated by a hydrophobing agent.

* * * * *